US006023685A

United States Patent [19]
Brett et al.

[11] Patent Number: 6,023,685
[45] Date of Patent: Feb. 8, 2000

[54] COMPUTER CONTROLLED EVENT TICKET AUCTIONING SYSTEM

[76] Inventors: Kenton F. Brett, 402 W. Kessle Blvd., Indianapolis, Ind. 46208; Ronald W. Brumbarger, 7831 Bay Ridge, Indianapolis, Ind. 46236

[21] Appl. No.: 08/862,547

[22] Filed: May 23, 1997

Related U.S. Application Data

[60] Provisional application No. 60/018,211, May 23, 1996.

[51] Int. Cl.[7] .................................................... G06F 17/60
[52] U.S. Cl. .................................... 705/37; 705/5; 705/26
[58] Field of Search .................................. 705/26, 37, 5, 705/6, 22, 27, 10

[56] References Cited

U.S. PATENT DOCUMENTS

| | | | |
|---|---|---|---|
| 4,603,232 | 7/1986 | Kurland et al. | 179/2 AS |
| 4,788,643 | 11/1988 | Trippe et al. | 705/6 |
| 4,789,928 | 12/1988 | Fujisaki | 705/37 |
| 4,816,904 | 3/1989 | McKenna et al. | 358/84 |
| 4,862,357 | 8/1989 | Ahlstrom et al. | 705/6 |
| 5,136,501 | 8/1992 | Silverman et al. | 705/37 |
| 5,237,499 | 8/1993 | Garback | 705/5 |
| 5,239,480 | 8/1993 | Huegel | 705/5 |
| 5,253,165 | 10/1993 | Leiseca et al. | 705/5 |
| 5,311,425 | 5/1994 | Inada | 705/6 |
| 5,408,417 | 4/1995 | Wilder | 705/5 |
| 5,422,809 | 6/1995 | Griffen et al. | 705/5 |
| 5,794,207 | 8/1998 | Walker et al. | 705/1 |
| 5,794,219 | 8/1998 | Brown | 705/37 |
| 5,826,244 | 10/1998 | Huberman | 705/37 |

OTHER PUBLICATIONS

Yahoo!, Inc. (www.auction.yahoo.com), 1994–1998.
Internet web site: http://www. ticket master.com/(internet ticket sales).
Internet web site:http://www.onsale.com/(auctions of computer equipment).
Internet web site:http://www2.amrcorp.com/auction/rules.htm/(American Airlines auction).

*Primary Examiner*—James P. Trammell
*Assistant Examiner*—Demetra R. Smith
*Attorney, Agent, or Firm*—Russell E. Fowler, II; Ice Miller Donadio & Ryan

[57] ABSTRACT

An automated event ticket auctioning system receives and evaluates bid information records received from a plurality of remote terminals. The bid information records correspond to bids for one or more seats within a venue and corresponding to at least one particular event, wherein the venue has a plurality of sections, each section having a plurality of seats. The automated event ticket auctioning system includes a memory storing a plurality of previously accepted bid information records, the previously accepted bid information records each including identification information, section identification, quantity information and bid price information. The system further includes a central controlling computer operably connected to the memory. The central controlling computer is operable to first receive a message including a received bid information record from one of a plurality of remote terminals through a communication system. The received bid information record includes received identification information, received section identification, received quantity information, and received bid price information. The central controlling computer is further operable to determine a lowest minimum acceptable bid value corresponding to the received section information using the previously accepted bid information records stored in the memory, and store the received bid information record if a value represented by the received bid price information exceeds the lowest minimum acceptable bid value. The automated event ticket auctioning system further includes a programmed graphical representation method designed to efficiently convey to auction participants useful standing bid information across the entire event venue, allowing seat bid price locations to be quantified in an effective manner. The system further includes programmed methods for ensuring contiguous grouping of seat location within each multiple ticket bid, and for ensuring that the standing bid information is automatically updated on a real-time basis and presented as such to all auction participants.

13 Claims, 13 Drawing Sheets

Microfiche Appendix Included
(11 Microfiche, 394 Pages)

FIG. 5a

Table: Main Auction Database

| Field Name | Data Type | Description | |
|---|---|---|---|
| BIDID | Counter | Bid ID# | (indexed) |
| SXN | Text | Section | text |
| ASEATS | Number | # of seats requested | integer |
| RSEATS | Number | # of seats received | integer |
| ABID | Number | $ amount bid | integer |
| RANK | Number | rank for this section | integer |
| FSEATID | Number | first seat ID# | integer |
| LSEATID | Number | last seat ID# | integer |
| BIDDERID | Number | bidder ID# | integer |

FIG. 5b

Table: Main Auction Database

| BIDID | SXN | ASEATS | RSEATS | ABID | RANK | FSEATID | LSEATID | BIDDERID |
|---|---|---|---|---|---|---|---|---|
| 1 | a | 2 | 2 | 30 | 1 | 1 | 2 | 3 |
| 2 | a | 4 | 4 | 28 | 2 | 3 | 6 | 1 |
| 3 | a | 2 | 1 | 15 | 6 | 12 | 12 | 5 |
| 4 | a | 2 | 2 | 19 | 5 | 10 | 11 | 2 |
| 5 | a | 2 | 2 | 24 | 4 | 8 | 9 | 6 |
| 6 | a | 1 | 1 | 25 | 3 | 7 | 7 | 4 |

(Counter)

FIG. 6a

Table: Seating Database

| Field Name | Data Type | Description | |
|---|---|---|---|
| SEATID | Counter | | (indexed) |
| SECTION | Text | section | text |
| ROW | Text | row | text |
| SEAT | Number | seat number | integer |
| MINBID | Number | starting minimum bid | integer |
| STNDBID | Number | standing bid for this seat | integer |
| BIDID | Number | bid ID # | integer |

FIG. 6b

Table Seating Database

| SEATID | SECTION | ROW | SEAT | MINBID | STNDBID | BIDID |
|---|---|---|---|---|---|---|
| 1 | a | 1 | 1 | 15 | 30 | 1 |
| 2 | a | 1 | 2 | 15 | 30 | 1 |
| 3 | a | 1 | 3 | 15 | 28 | 2 |
| 4 | a | 2 | 1 | 15 | 28 | 2 |
| 5 | a | 2 | 2 | 15 | 28 | 2 |
| 6 | a | 2 | 3 | 15 | 28 | 2 |
| 7 | a | 3 | 1 | 15 | 25 | 6 |
| 8 | a | 3 | 2 | 15 | 24 | 5 |
| 9 | a | 3 | 3 | 15 | 24 | 5 |
| 10 | a | 4 | 1 | 15 | 19 | 4 |
| 11 | a | 4 | 2 | 15 | 19 | 4 |
| 12 | a | 4 | 3 | 15 | 15 | 3 |
| (Counter) | | | | | | |

FIG. 7

| Table: Participant Database | | |
|---|---|---|
| Field Name | Data Type | Description |
| BIDDERID | Counter | (indexed) |
| FSTNAME | Text | FirstName |
| LSTNAME | Text | LastName |
| INIT | Text | Middle Initial |
| ADDRS1 | Text | Address1 |
| ADDRS2 | Text | Address2 |
| CITY | Text | City |
| STATE | Text | State |
| ZIPCD | Text | PostalCode |
| PHONE | Text | PhoneNumber |
| CCRD | Text | Credit card brand |
| CCRDN | Text | credit card number |
| EXPMO | Number | expiration month — integer |
| EXPYR | Number | expiration year — integer |
| SLIMIT | Number | self imposed limit on spending — integer |
| SETPASS | Text | password (optional) |
| CLIMIT | Number | credit card limit remainig — integer |

FIG. 8

▭ Table: Market Research Database

| | Field Name | Data Type | Description | |
|---|---|---|---|---|
| ⚷▸ | BIDID | Number | Bid ID# | (indexed) |
| | SXN | Text | Section | text |
| | ASEATS | Number | # of seats requested | integer |
| | RSEATS | Number | # of seats received | integer |
| | ABID | Number | $ amount bid | integer |
| | ORANK | Number | original rank in this section | integer |
| | BMPTIME | Date/Time | time the bid was removed | Time |
| | REASON | Text | bumped, canceled or replaced? | text |
| | RBIDID | Number | Bid ID# of replacing bid. | integer |
| | BIDDERID | Number | bidder ID# | integer |

FIG. 10

[sponsor's name here] PRESENTS...
[performer's name here]
7pm Nov 12, AT THE ARENA rules Bidding in process!!

STAGE

Your Standing Bids:

Section A:
2 seats @$140

Section G:
3 seats @$33

Total bill: $379

(numbers roughly show present bid price locations)

To place or cancel bid, click on desired section

[sponsor's name here] PRESENTS...
[performer's name here]
7pm Nov 12, AT THE ARENA

SECTION C

Bidding in process!!
rules 85  66
   60
  76
stage ← 95  73  63  57
   (high)    (low)
   79
      59
84  71

(numbers show present bid price locations)

You Chose <u>Section C</u>.

Card number or
Password From
Registration: ☐

Number of Seats: ☐

Bid per seat: ☐
(whole dollars only)

[Submit]  [Clear Form]

To cancel a bid you have
sent, check this box and
click on "submit" ☐

111

COMPUTER CONTROLLED EVENT TICKET AUCTIONING SYSTEM

CROSS-REFERENCE TO RELATED APPLICATIONS

This is a continuation of provisional application Ser. No. 60/018,211 filed May 23, 1996.

This application incorporates a microfiche appendix consisting of 11 microfiche and 380 frames.

1. Field of the Invention

The present invention relates to a system that uses communication lines connecting participants from various locations, such as personal computers connected via the internet, to a central computer which conducts a real-time auction of tickets to sporting and entertainment events.

2. Background of the Invention

The established method of selling tickets to sporting and entertainment events involves pre-setting inflexible prices then releasing the tickets for sale at a box office or by phone. This method has a number of shortcomings. Typically, each sale involves employees taking time-consuming individual orders and trying to describe the prices and seat locations to customers. Another shortcoming with this method is that especially for premium events, it can be highly inconvenient and sometimes impossible for the purchaser to access the sale due to demand. Moreover, for practical reasons, prices are assigned to tickets in large blocks, while, in reality, purchasers often consider tickets within a block to have a wide ranging continuum of values; and these market values can be very hard to estimate before the tickets are sold. Largely because of these shortcomings, many premium tickets are sold for substantially less than their market value. Generally, these shortcomings exist even with new automated methods involving phone or internet sales since the number of tickets is limited and the selling system is still fundamentally the same; with "first-come-first-served" orders taken for pre-priced tickets.

Although it is widely known that the market values some tickets at a substantial premium over face value, there has been no system available for accurately establishing and selling these tickets at their market value. Logistically, auctioning the tickets has not been feasible due to the large quantity of unique seats and even larger quantity of buyers wishing to purchase them.

A few auction systems have been developed that operate using the internet as the communications mode. These systems have been used to auction items such as computer equipment, artwork, and special items for charity. However, these systems are not suitable for use in connection with a real-time mass auction of event tickets. With the currently operating systems, generally the items being sold are of a small quantity or individually unique. In most of the currently operating systems, the items for sale are individually listed, and individually bid upon using e-mail over a period of days or weeks. While, the currently operating systems are useful for such limited purposes, they have several shortcomings.

One such shortcoming arises from the use of e-mail to place bids and to update participants of their bid status. While in theory e-mail is instantaneous, there are occasional routing delays of which the sender is often not immediately aware. In an auction of a slow, deliberate nature such as those presently operating, this is not a great concern. However, in a fast pace auction with numerous participants some bids could be lost as delayed e-mail, unbeknownst to the participant.

An additional problem with the e-mail approach is that time may elapse before the bid information is read and applied. Therefore, the participant may not get instantaneous feedback on other bids which may be taking place simultaneously. The participant often must wait for some period of time to learn if the bid is successful. If the participant has a strategy for bidding on a very desirable item, the participant must return to the auction numerous times to follow its progression.

Most currently operating systems provide some general bid status data, usually a minimal amount of information such as "current" high bid. This "current" high bid is updated by periodically reviewing the bids received, and entering the highest bid to date. Therefore, these "current" bids are not current up to the second. Moreover, if there are many of a particular item, especially such as event tickets having a continuum of values, participants need to know considerably more than the high bid information in order to make an informed bidding decision.

Currently operating systems do not provide bid status information updates independent of solicitation of the information from participants. Once the internet auction site is accessed, the information conveyed may become outdated as it is being viewed. Again this would be quite unfavorable for fast-paced auctions. Therefore, even with auction sites which were actually being updated real-time, a participant would need to continually re-access the site in order to keep information truly updated.

One internet auction system, "onsale" at http://www.onsale.com/ attempts to overcome the e-mail auction problems by automatically updating its internet site. However, like the other internet auction sites, onsale conducts relatively slow, deliberate sales, and still relies on e-mail to transmit some of the bid information. In addition, although the onsale auction site is automatically updated, it does not automatically present this information to participants. As explained above, participants need to continually re-access the site in order to keep information truly updated.

U.S. Pat. No. 4,689,928 details an auction system for used cars that is capable of interactive, essentially real-time auctioning. Instead of internet based, this used car auctioning system is constructed with a 4-level hierarchy of computers networked to a plurality of auto dealers terminals. At each level, the bids received by the computer are processed and only select bids are transmitted to the next level. The bids are raised in increments of 3000 yen and the participants may bid via a single signal indicating a "yes" in response to the bid being raised. This system is based on the traditional auction format, and is used to sell one item or lot at a time. When a car has been auctioned, a disc is loaded by each dealer into his terminal which shows the photograph of the next car to be auctioned. Bidding is limited to a predetermined group of auto dealers. Because the structure of this system is hierarchical, i.e. not on the internet, it is not practical for use in wide-spread auctions available to consumers. Because of the methodical nature of this system, selling a progression of single items with incremented bids, it is geared for low volume sales of items with relatively high values.

Recently tickets have been made available for purchase on the internet, for example at http.www.ticketmaster.com/ but not in an auction format, as is needed to sell certain tickets at their market prices. At this internet site, sales are of the traditional pre-set pricing, "first-come-first-served" format.

Considering the selling of a large number of tickets to an event, there are unique circumstances which present challenges not manifested in selling other items. For example, in a particular auction, all the tickets may be for the same venue, date, time, and performance. However, each of these tickets also possesses the very unique characteristic of seat location. This characteristic can dramatically effect the ticket value. Ticket values typically vary widely, yet in a continuum from closest to farthest from the performance area. Thus, it is not practical to mass the tickets into simple generic blocks to be auctioned. Nor is it practical to list and auction each ticket individually, since this could present auction participants with a prohibitively large number of individual auctions, and no practical way to obtain contiguous seats. Accordingly, there exists a need for a system which can, within a single, clear format, auction a large number of items with a continuum of values, each at its market price. Furthermore, this system needs to apply logic in sorting bids based not only on price, but on clustering requirements to ensure that within a multiple-ticket bid, the seats are adjoining. This would require a database configuration unlike that employed by the prior art.

Moreover, given the furious pace of sales for many premium tickets, there exists the unique and as yet, unmet challenge of providing instant, automatic, comprehensive feedback for status of a relatively complex arrangement of standing bids. Frequently the more popular sporting and entertainment events sell all available tickets in a matter of a few minutes. The number of tickets to these events may reach into the hundreds of thousands. A practicable auction of tickets for such an event would require a system uniquely designed to process this large volume while presenting an updated, clear and informative view of the proceedings to all participants. It would be logical to presume that efficient conveyance of bid information for a large, complex pattern of bids would require a graphical representation of the bid standings. Although some internet auctions employ graphical representation of objects for sale, none employ graphical representation of bid status.

In spite of their shortcomings, the above mentioned prior art systems are useful for their respective intended purposes. However, given their limitations, and the above noted unique circumstances for mass ticket sales, it is simply not practical or feasible to apply any of the prior art to the particular task of auctioning a large volume of event tickets.

SUMMARY OF THE INVENTION

Accordingly, an object of the present invention is to provide a computer controlled auctioning system, in which an unlimited number of participants may have simultaneous access to the desired event tickets. The above stated needs as well as others are fulfilled by the present invention through a system constructed to sell a large number of tickets in a very short time, each said ticket or group of tickets being sold for a value set by existing market forces. The system provides participants with simple, yet informative graphical standing bid information on the entire stock of tickets available, and allows them real-time bidding interaction. This system can achieve such sales even for events of extremely high public interest, without excluding any potential purchasers.

The present invention achieves said objectives by employing a computer controlled event ticket auctioning system which receives and evaluates bid information records received from a plurality of remote terminals, said bid information records corresponding to bids for one or more seats within a venue and corresponding to at least one particular event, said venue having a plurality of sections, each section having a plurality of seats.

The automated event ticket auctioning system is comprised of a memory storing a plurality of previously accepted bid information records, said records each including identification information, section identification, quantity information, and bid price information. The automated event ticket auctioning system is further comprised of a central controlling computer operably connected to the memory and operable to receive a message including a received bid information record from one of a plurality of remote terminals through a communication system, determine a lowest minimum acceptable bid value corresponding to the received section information using the previously accepted bid information records stored in the memory, and store the received bid information record if a value represented by the received bid price information exceeds the lowest minimum acceptable bid value.

The central controlling computer is further operable to, in a like manor, receive, evaluate and store if acceptable, subsequent bids received and to stop receiving subsequent messages after a predetermined time period.

Within the automated event ticket auctioning system, each previously accepted bid information record includes rank information based on the section information and the bid price information, and the central controlling computer is further operable to assign a rank to each received bid information record based on its section identification, its bid price information, and the previously accepted bid information records.

After stopping receiving subsequent messages, the central controlling computer is further operable to associate one or more particular seats of the venue with a previously accepted bid information record based on the rank information and the section information of each of a plurality of previously accepted bid information records.

The automated event ticket auctioning system further includes a programmed graphical representation method designed to efficiently convey to auction participants useful standing bid information across the entire event venue, allowing seat bid price locations to be quantified in an effective manner.

The system further includes programmed methods for ensuring contiguous grouping of seat location within each multiple ticket bid, and for ensuring that the standing bid information is automatically updated on a real-time basis and presented as such to all auction participants; said programmed method employing HTML programming features such as the recently available META refresh (a client pull type browser directive) or the multipart/mixed MIME format (a server push type browser directive).

Participants may access this system from remote sites using terminals such as personal computers, via telephone lines or other means of communication. The status of bids and seat locations are conveyed on graphic displays of the venue seating arrangement which are updated on a real-time basis for all participants to view. Participants may place bids of any amount, subject to pre-determined limits, and cancel, raise, or lower bids at will. In addition, participants may view their personal bid standings and the updated overall bid standings without having to continually re-access the auction site. Through the participants' remote terminals, the personal bid requests are sent to the host computer which immediately processes, and sorts the bids according to section and price. The central computer immediately updates and displays the new bid standing order. When the auction is closed, the bids become fixed and the physical transaction can occur.

BRIEF DESCRIPTION OF THE DIAGRAMS

FIGS. 5a and 5b is an exemplary representation of the main auction database storing the order of bids received.

FIGS. 6a and 6b is an exemplary representation of a referring database which stores the seating arrangements and available tickets for sale.

FIG. 7 is an exemplary representation of a referring database which stores the participants identity and personal and payment information.

FIG. 8 is an example of the statistical record of all bid events received: for use in marketing studies and customer service.

FIG. 10 is an example of the participant's terminal screen, as it might appear during an auction. The terminal displays a graphical representation of the venue of seats to be auctioned, the present bid price of those seats, and the personal bid standing for this particular participant.

FIG. 11 is an example of the participant's terminal screen when the desired section is chosen for bidding. The bid form is included on this screen.

DESCRIPTION OF THE PREFERRED EMBODIMENT

Figure 1:
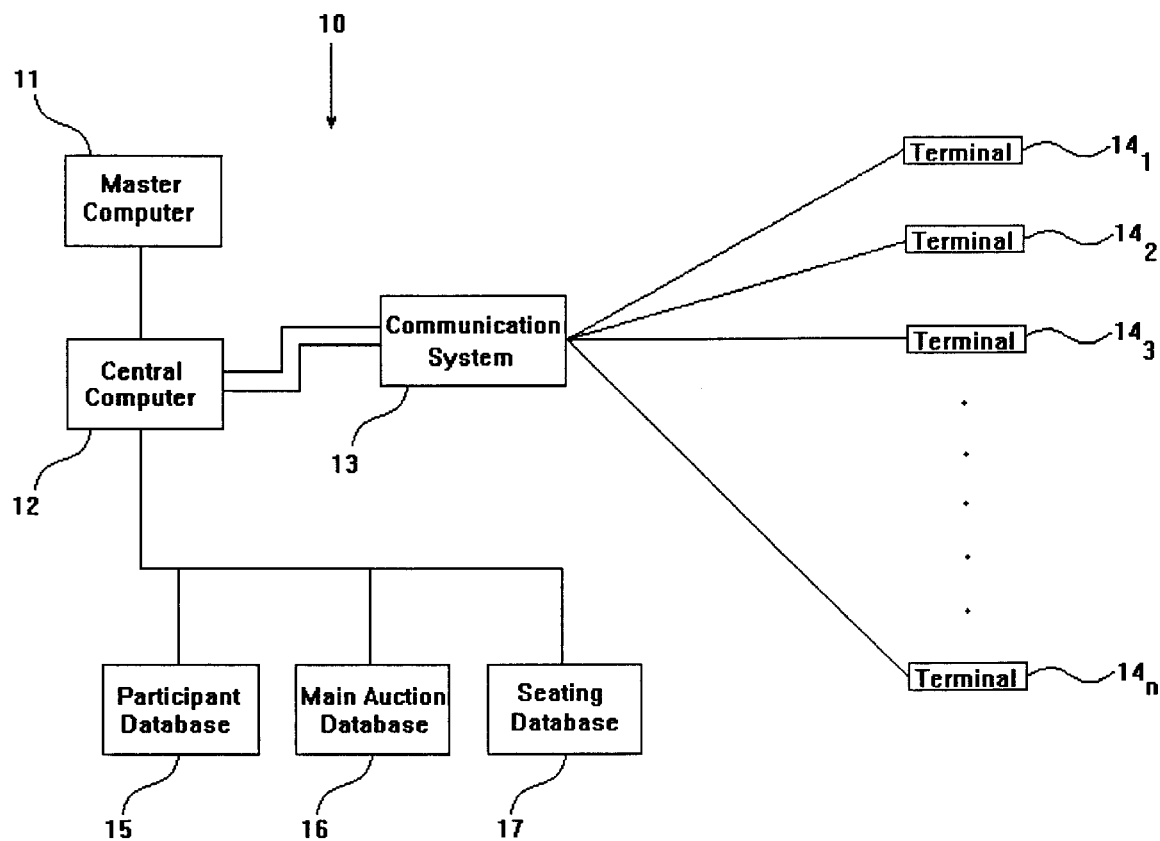
FIG. 1 is a block diagram of an exemplary system built in accordance with the present invention.

FIG. 1 shows a computer controlled auctioning system 10 which is built according to the present invention. As, shown, the computer controlled auctioning system 10 is comprised of a central computer 12 such as an internet server which sends and receives information through a communication system 13 such as the public telephone system, television cable system, or satellite communications system to remote terminals $14_1, 14_2, 14_3 \ldots 14_n$, such as personal computers or other network accessing devices. In this embodiment, internet sites are constructed consisting of web pages of graphics and text stored as html files, which present the necessary information pertaining to upcoming events and ticket sales. These sites are stored in the memory of the central computer 12. The construction and initiation of these sites is shown as step 22 and step 23 in FIG. 2, which is a flowchart illustrating the general operation of this exemplary system.

Figure 2:
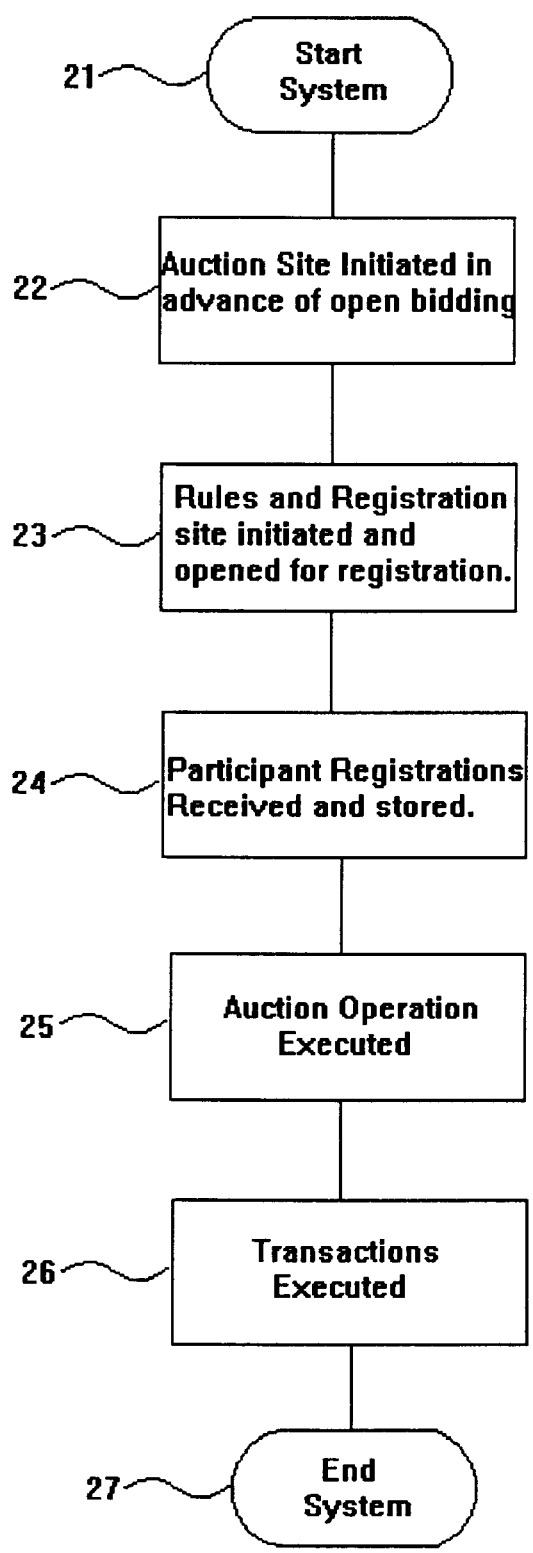
FIG. 2 is a flowchart illustrating an exemplary system built in accordance with the present invention.

Accordingly, consumers wishing to become participants in an upcoming auction may access the central computer 12 of FIG. 1 through any remote terminal $14_1, 14_2, 14_3 \ldots 14_n$ to receive a wide variety of information about the auctions, the related events, venues, performers or teams, schedules, and merchandise; and to pre-register for the auction and payment. The registration process is represented as step 24 in FIG. 2. Next, as FIG. 2 illustrates, the auction operation 25 is executed; the transactions 26 take place, and the system is ended 27. These steps are described in more detail below.

Referring again to FIG. 1, registration and bid information originating in the remote terminals $14_1, 14_2, 14_3 \ldots 14_n$ is transferred via the communication system 13 and received by the central computer 12. The central computer 12 processes said information and stores it in databases: specifically, the participant database 15 for registrations and the main auction database 16 for bids. The central computer 12 also performs sorting and indexing operations, described below, necessary to keep the information in the databases current and correctly ordered. The central computer 12 processes and controls the information flowing between the internet sites and the databases with programming written in C++ language. Registration information may be received and stored before and during operation of the auction. The participant database, represented by FIG. 7 contains the name, address, and payment information for all participants, and is used as a referring database to the main auction database, represented by FIG. 5, during the open auction and for billing purposes when the auction is concluded. FIG. 5 and FIG. 7 are detailed below.

Referring again to FIG. 1, a master computer 11 is connected to the central computer 12 for purposes of setting up, initiating, monitoring and dismantling the auction, and its related sites or pages. For example, in preparation for an auction, numerous details specific to that auction, such as minimum initial bids, event and sponsor names, dates and times, and seating arrangements are generated using the master computer 11 and then transferred by disk or modem or other means to the central computer 12 when needed. The central computer 12 stores these parameters for later application to the auction process. In particular, the central computer 12 stores in the seating database 17, the specific seating arrangement as a unique record for each seat available. The auction is then conducted by the central computer 12, as described below. During the auction, the master computer 11 can be used to monitor the auction progress, make any necessary spontaneous changes to existing parameters, and to generally ensure that the auction is conducted with a minimum of problems. In practice, it may be possible to combine the functions of the central computer 12 and the Master computer 11.

Figure 3:
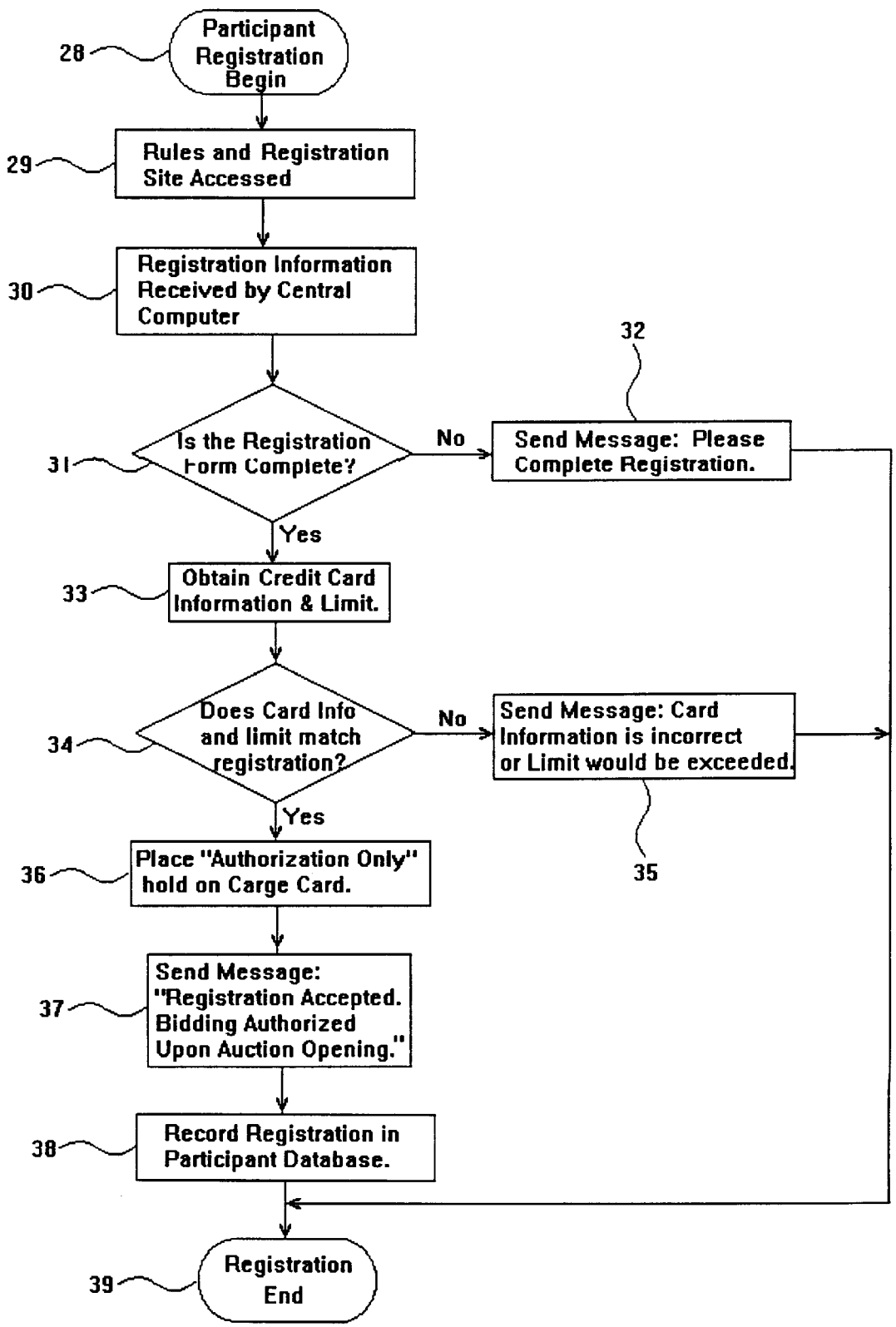
FIG. 3 is a flowchart illustrating an exemplary participant registration procedure used in a system built in accordance with the present invention.

Step 24 in FIG. 2 is illustrated in detail by FIG. 3, an exemplary participant registration flowchart. The potential registrant begins in step 28 by interfacing with one of the terminals, for example, terminal $14_1$, of FIG. 1. When the rules and registration internet site is accessed at step 29 of FIG. 3, the registrant is encouraged to read the auction rules thoroughly, and agree to their terms. This site includes a registration form which will contain that registrant's personal information including records for the fields illustrated in the participant database of FIG. 7, as well as a checkbox for agreement to the terms of the auction rules, and a password, if desired to protect access. The password may be chosen for use when accessing the auction, in lieu of re-entering the credit card number. This allows the participant to have an agent place bids, without disclosing the credit card number.

The central computer 12 of FIG. 1 performs all remaining steps in this registration process depicted in FIG. 3. In step 30, of FIG. 3, the registration information is received and in step 31, a determination is made as to whether the information is satisfactorily complete. If not, a message to that effect is sent in step 32 back to the registrant, and the registration process is ended at step 39. If the registration information is satisfactorily complete, then in step 33, the credit information is obtained through existing credit card systems for comparison to the information given by the registrant. In step 34, said comparison is performed and if the credit information does not match or the limit is exceeded, a message to that effect is sent in step 35 back to the registrant, and the registration process is ended at step 39. If in step 34 the card is determined to be valid and the limit not to be exceeded, then in step 36, an 'authorization only' hold is placed on the registrant's credit card, for an amount specified by the participant. This limit, also stored in the participant database of FIG. 7, will be that registrant/participant's maximum allowable bid during the upcoming open auction. The authorization hold verifies and reserves the payment means for the seller, while limiting unauthorized bids made by agents of the registrant/participant. Referring again to FIG. 3, in step 37, the registrant is notified that the registration was accepted and then in step 38, the records are sent to the participant database before the registration is ended in step 39.

Figure 9:
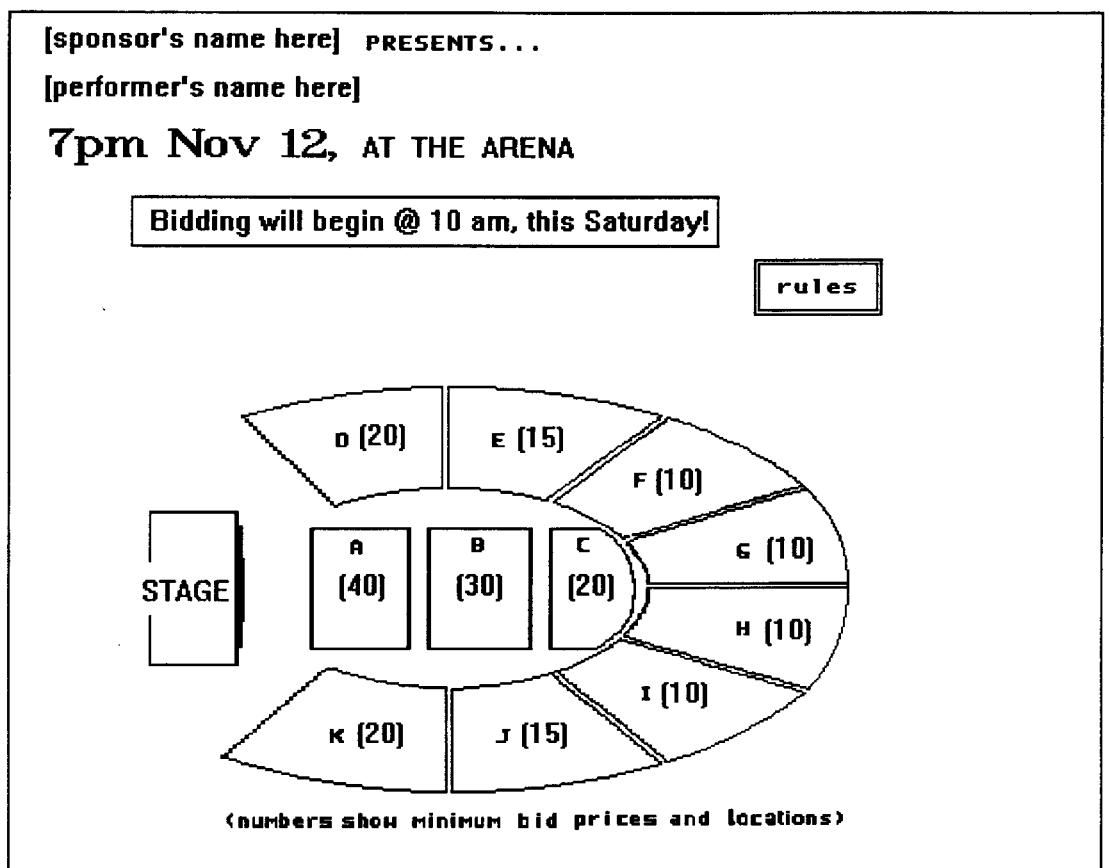
FIG. 9 is an example of the participant's terminal screen, as it might appear before the beginning of an auction. The terminal displays a graphical representation of the venue of seats to be auctioned and the pre-set minimum bid price of those seats.

At step 22 of FIG. 2 before the auction is opened, an internet site is constructed and initiated to provide viewing of graphical displays of the seating and sale information to the participants. FIG. 9 represents one such view, with initial minimum bids displayed in each section. All potential participants may access and view this site before the auction is opened. When the auction is opened, the central computer 12 of FIG. 1 activates the site to become interactive, so participants can use it to place bids. The site activation is represented as step 40 in FIG. 4 which is discussed below. When a participant places a bid, the information is received and then processed by the central computer 12 of FIG. 1 according to the flowchart outlined in FIG. 4.

Figure 4:
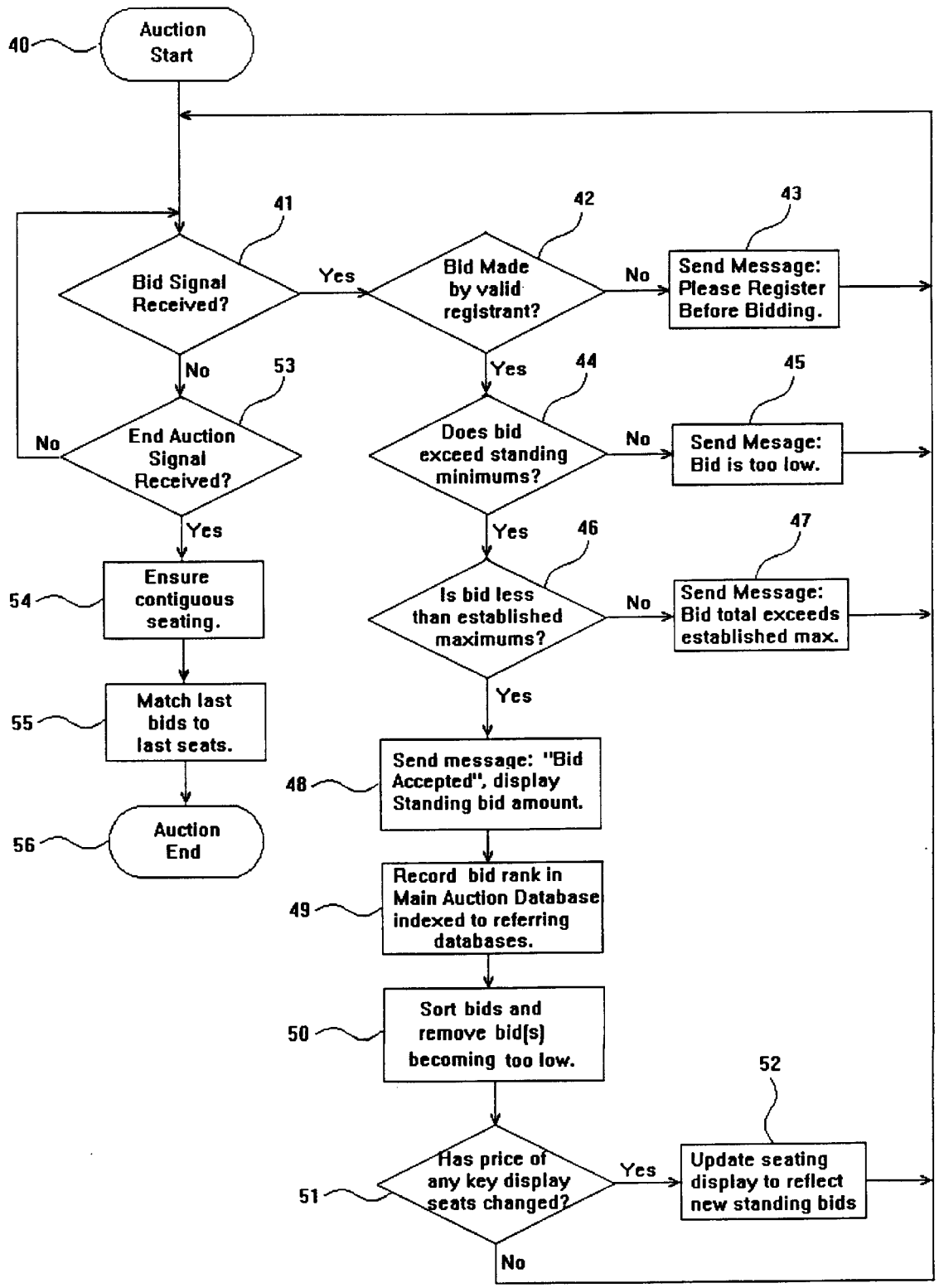
FIG. 4 is a flowchart illustrating an exemplary auction procedure used in a system built in accordance with the present invention.

FIG. 4 is a flowchart illustrating an exemplary auction procedure which is step 25 in FIG. 2. The central computer 12 of FIG. 1 performs all steps in this auction process depicted in FIG. 4. In addition, all bid information received by participants' remote terminals is generated by the central computer 12 of FIG. 1 as web-pages constructed of html programming code. In step 41 of FIG. 4, a bid information record (bid) is received as a response to a web-page form: an html programming tool commonly used to submit information from a personal computer to a server. A bid information record includes received identification information, received section identification, received quantity information, and received bid price information. When a bid is received, as in step 41, then in step 42 a check is made to ensure participant's registration is on record. This is accomplished by conducting a query on the participant database 15 of FIG. 1, detailed in FIG. 7, using the received bid identification information as the query criterion. If the query finds the participant is not registered, a message to that effect is sent in step 43 back to the participant, and the bid is not recorded.

If the query finds the participant is registered, then in step 44 of FIG. 4, a check is made to ensure the participant's bid exceeds the standing minimum bid for the particular section requested. This is accomplished by conducting a query on the main auction database 16 of FIG. 1, detailed in FIG. 5, using the received section identification and bid price information as the query criteria. If the query finds the bid price too low, a message to that effect is sent in step 45 back to the participant, and the bid is not recorded. If the query finds the bid price is not too low, then in step 46, a check is made to ensure the participant's bid is less than the established maximum; specifically, the amount of the authorization only hold established in the participant registration and stored, for example, under the field name "SLIMIT" in the participant database of FIG. 7. Again, this is accomplished by conducting a query on the participant database using the received bid price information as the query criterion. If this maximum is exceeded, a message to that effect is sent in step 47 of FIG. 4 back to the participant, and the bid is not recorded. Upon receipt of such a message, the participant may chose to re-register in order to raise the set maximum. However, an agent of the participant would be unable to do so without the credit card information. Thus, protection is afforded by use of the password established in the participant registration and stored, for example under the field name "SETPASS" shown in the participant database of FIG. 7.

Referring again to FIG. 4, if the comparison in step 46 is positive, then the bid is accepted and displayed as in step 48. In step 49, the bid information record is recorded to the main auction database of FIG. 5 and indexed to the corresponding participant in the participant database of FIG. 7. In step 50 of FIG. 4, again using the received bid price information as the query criterion, the bid is then inserted at the appropriate rank in the seating database of FIG. 6, described below, and indexed to the corresponding bid record in the main auction database of FIG. 5, with lower standing bids being reordered to reflect the new standings. At this step, the lowest bid(s) are removed from the order, (bumped), unless additional seats are still available. Bumped bids are stored in a market research database, represented in FIG. 8, the format of which is similar to that of the main auction database. An added function of this database is to ensure that an accurate record of each bid event can be identified for customer service purposes. Next, participants whose bids become too low are notified.

As shown in step 51 and step 52, if the standing bid price of a pre-selected key seat in the graphical representation has changed as a result of the latest bid, this change is reflected immediately by automatically updating the display of the current bid standings. These prices are displayed within the graphical view of the seating and sale information, just as the initial minimum bids were displayed in FIG. 9. A representation of this real-time bid status view is shown in FIG. 10. This interactive view gives participants clear, useful information sufficient to make bid decisions, regardless of the number of tickets for sale or what location is desired. More precise information is readily obtainable by simply clicking the mouse on the desired section. This action summons the bid form along with a more precise bid status graphic such as shown in FIG. 11. The standing prices represented on these interactive sites are obtained by the central computer 12 of FIG. 1 from records stored in the seating database 17 and inserted into the html file for display to participants. This task is step 52 of FIG. 4 and is repeated each time a change has occurred in the standing bid price of one of these key seats. This determination is represented as step 51 of FIG. 4. These changes are automatically presented to the participants by means of META refresh, a client pull type html programming feature which directs the browser to automatically refresh the information every x seconds, where x is a variable programmed into the html file code. If no key seat prices have changed, no further action is taken until the next bid is received or the auction is ended. In step 53, the auction may be ended in response to a signal which may be sent from the master computer 11 of FIG. 1 or from an internal timer or some other predetermined means.

Figure 12:
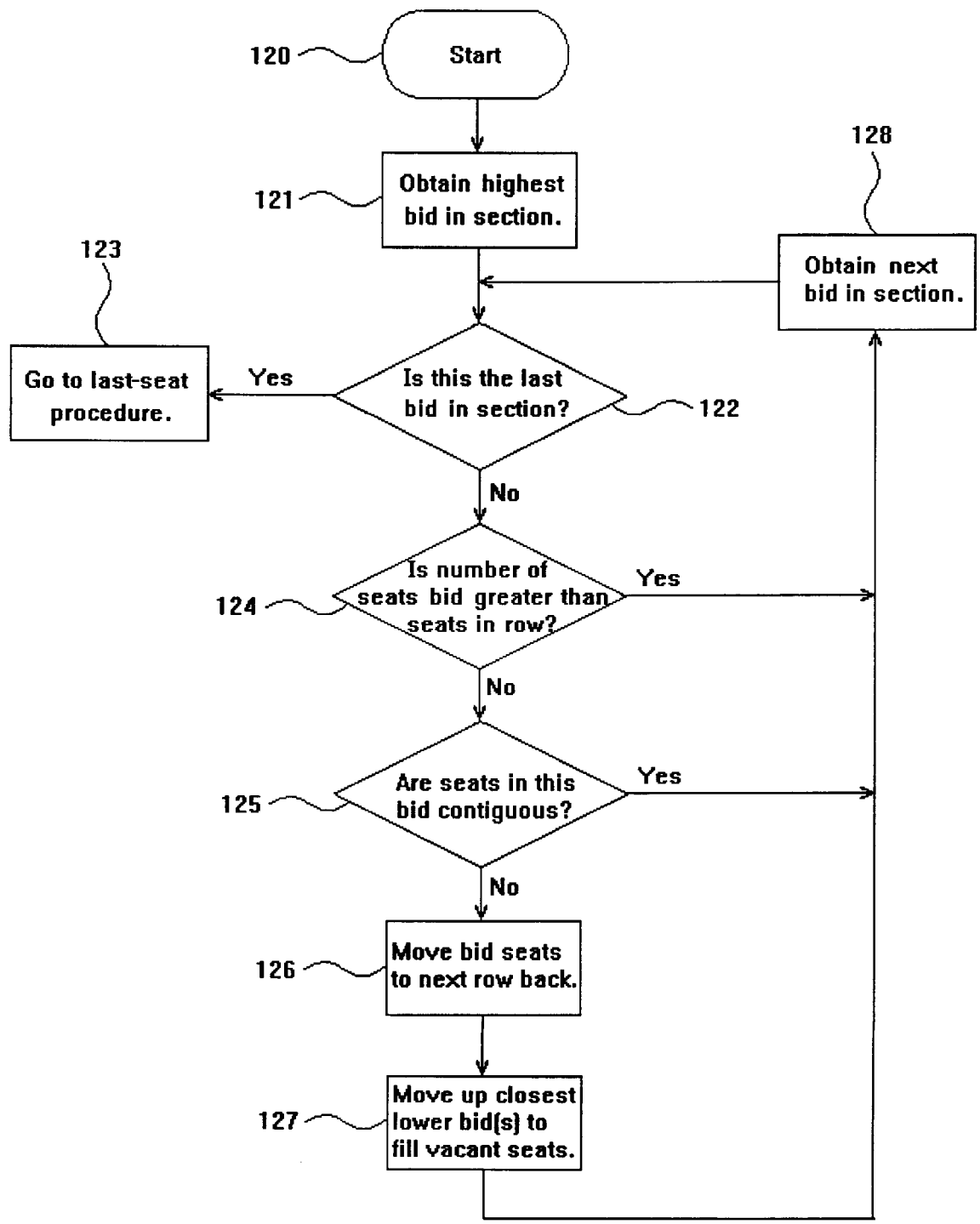
FIG. 12 is a flowchart illustrating an exemplary algorithm used to ensure contiguous seats within each bid in a system built in accordance with the present invention.
Figure 13:
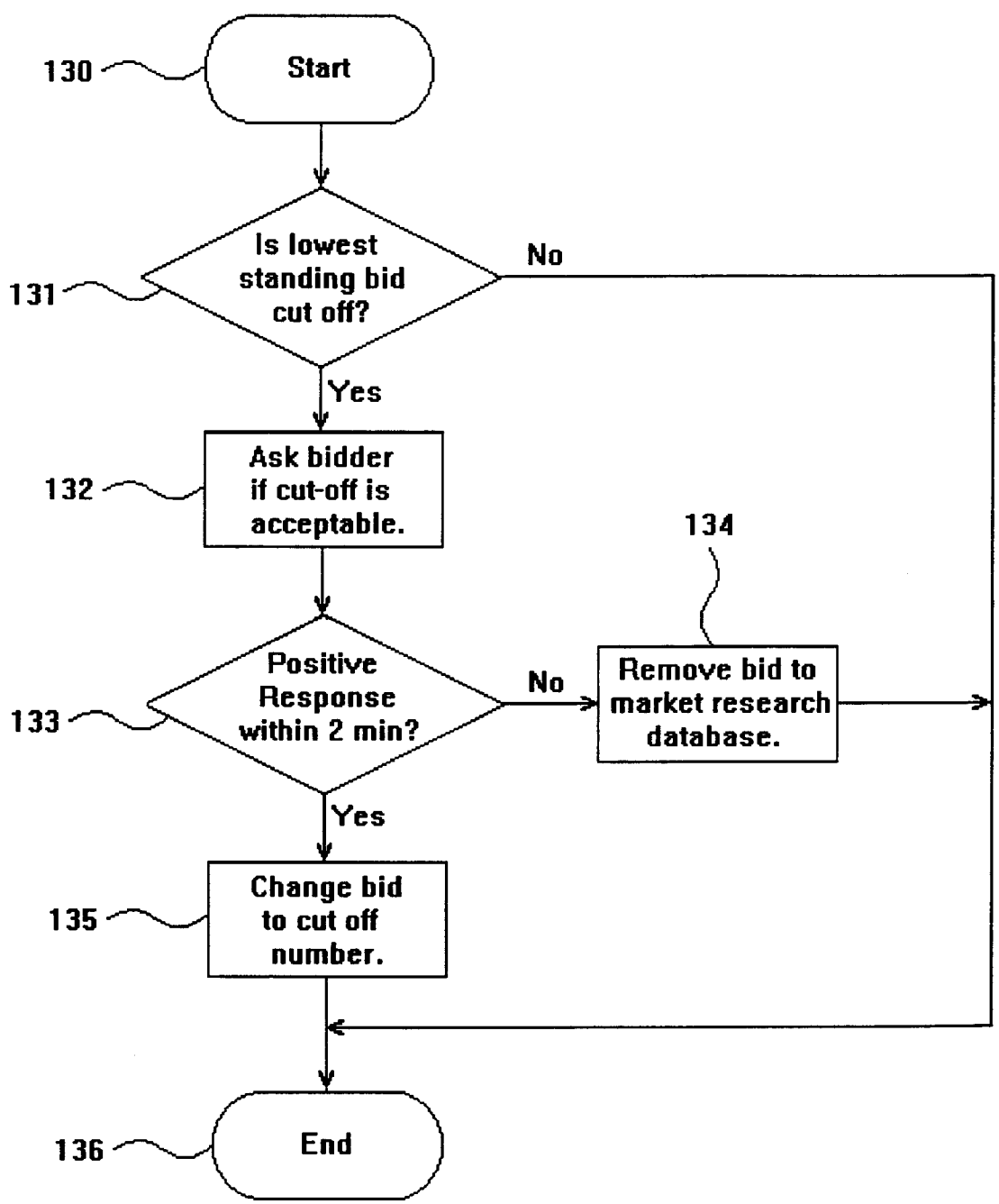
FIG. 13 is a flowchart illustrating an exemplary algorithm used to match the number of available seats with the number of seats requested by winning bidders in a system built in accordance with the present invention.

In step 54, of FIG. 4, finalizing the seat assignments involves application of an algorithm designed to ensure that seats within a bid are contiguous. FIG. 12 is and example of such an algorithm. For each section of seats in the venue this algorithm is executed, starting with the highest bid, obtained in step 121, and working back. If the bid presently under evaluation is the last in its section., then a different algorithm is used. This determination and action is step 122 and step 123. If the bid presently under evaluation is not the last in its section, then in step 124, it is determined if the number of seats required by the bid is more than the number existing in its row. If so, it is impossible for all the seats to be contiguous, and the process begins for the next bid, in step 128. If not, in step 125 the next decision is to see if there are any breaks in the seat grouping. If not, the process again begins for the next bid, in step 128. If so, the group of seats is moved to the next row back, step 126, and the resulting seat vacancies are filled by moving the next lower bid(s) forward, step 127. In unusual circumstances, this could result in the moved group spanning two rows again. In this exemplary algorithm, the group will not be moved again, it will remain split. When the last active bid is processed, the last-seat algorithm shown in FIG. 13 is applied. If the number of seats in the bid is greater than the number of seats remaining in the section, step 131, then in step 132 the bidder is notified of the cut-off and asked it the reduced number of seats will suffice. In step 133 and step 134 if the reply is negative or if there is no reply within 2 minutes, the bid is removed. If there is a positive reply, the number of tickets is reduced to the available amount, and the algorithm is ended.

Referring again to FIG. 2, step 26, upon auction closing, successful bidders are immediately notified at their terminals and payment is confirmed. The credit cards are debited for the appropriate amounts, and the excess amount from the 'authorization only' hold is released. The tickets are then delivered by any of a number of conventional means.

FIG. 5a and FIG. 5b represent the main Auction database which stores and ranks all active bid records and pairs the associated participants and seats accordingly, by referencing the two referring databases. FIG. 5a is the design view of this database, defining the fields and their parameters, while FIG. 5b is the table view showing sample bid records for the first bids in a hypothetical auction. FIG. 6 depicts the seating database, which is the other referring database containing a record of each seat in the venue arranged in order of preference as predetermined by the promoter or ticket seller. This would probably be based on criteria such as distance from center stage, center court, or the finish line. In the case of a festival seating events, accessing the seating database would not be necessary.

The databases shown in FIG. 5, FIG. 6 and FIG. 7 contain records for a hypothetical auction that is greatly simplified for illustration purposes. This hypothetical event venue contains only 12 available seats, each defined by a record in the seating database (FIG. 6b). As shown, minimum bids had been pre-set at $15 and the highest bid received was bid #1 of $30, with a quantity of 2 seats. The first field in the seating database, "SEATID" contains the Unique seat identification number which is indexed to the main auction database (FIG. 5b) by the fields "FSEATID" (first seat identification number) and "LSEATID" (last seat identification number). The last field is "BIDDERID", in which are stored indices referencing records in the participant database. As shown in FIG. 5b, the lowest bid was #3, requesting 2 seats at $15. However, only one seat was reserved, since only one was available at that bid level. As detailed in FIG. 13 above, when the auction is ended, if one ticket is not satisfactory, this participant will be given the opportunity to cancel the bid.

FIG. 10 is a sample participant interface to the auction system during the open auction, represented here as a web page with graphical links to forms for placing bids. As exemplified here, the participant wishing to bid, simply uses a mouse to click on the desired section, calling up a bid form and a more precise view of standing bids to use as a guideline. FIG. 11 shows this more precise view for a participant who clicked on section C. The form on the right confirms this selection and prompts the participant for the specific bid information; while the diagram on the left shows that if, for instance, the bid placed is $73, then the seats will be in the middle of section C, unless future (higher) bids push it back. Likewise, in practice it is possible, albeit tedious, to display bid prices in every row or even for every seat.

Accordingly, a ticket seller could promote numerous entertainment events simultaneously at one network site, with the added step for the registrant/participant of choosing the desired event from those presented.

In one embodiment, a template may be loaded into participants' terminals prior to their accessing the auction site, said template providing text or graphic information that does not change during an auction or between auctions, such as background art, forms or instructions. Said template may be downloaded from the internet, or installed from a disc or by some other means. Use of a template allows the bid status updates to be made with transmission of only the numerical data, which in combination with the template, presents the comprehensive auction status update to participants. In another embodiment, the bid status changes are automatically presented to the participants by means of the multipart/mixed MIME format, a recently available server-push type programming feature which takes advantage of a connection that is held open over multiple responses, allowing the server to send more data at will. This method can be more efficient, since new HTTP connections do not have to be reopened.

It is to be understood that the above-described embodiments of the invention are merely illustrative. Other implementations may readily be devised by those of ordinary skill in the art which will embody the principles of the invention and fall within the spirit and scope thereof. In particular, the exemplary contiguous seat algorithm of FIG. 12 may readily be modified to allow repeated movements of a group to ensure adjacent seating or to allow block-style groupings, or other variations. Moreover, this ensuring of contiguous seats shown at step 54 of FIG. 4, could be performed as each bid is placed, rather than only at the close of the auction. Likewise, the last seat cut-off in step 55 of FIG. 4 could be executed with each bid made. Additionally, the auction system may readily be modified to sell each section of the venue in succession or at different internet locations.

We claim:

1. An automated event ticket auctioning system, the automated event ticket auctioning system receiving and evaluating bid information records received from a plurality of remote terminals, said bid information records corresponding to bids for one or more seats within a venue and corresponding to at least one particular event, said venue having a plurality of sections, each section having a plurality of seats, the automated event ticket auctioning system comprising:

a) a memory storing a plurality of previously accepted bid information records, said previously accepted bid information records each including identification information, section identification, quantity information, and bid price information, said memory also storing a seating database having a predetermined preferential rank for each seat in each section;

b) a central controlling computer operably connected to the memory and operable to receive a message including a received bid information record from one of the plurality of remote terminals through a communication system, said received bid information record including received identification information, received section identification, received quantity information, and received bid price information, determine a lowest minimum acceptable bid value corresponding to the received section information using the previously accepted bid information records stored in the memory, store the received bid information record if a value represented by the received bid price information exceeds the lowest minimum acceptable bid value, associate one or more particular seats having a predetermined preferential rank with the stored received bid information record based on the section identification and bid price information, and determine a ticket price for each of the one or more particular seats associated with a stored received bid information record based on the bid price information in the stored received bid information record associated with the seat.

2. The automated event ticket auctioning system of claim 1 wherein the central controlling computer is further operable to:

receive subsequent messages, each message including a subsequent received bid information record from one of a plurality of remote terminals through a communication system, each of said received bid information records including received identification information, received section identification, received quantity information, and received bid price information;

for each subsequent message, determine a lowest minimum acceptable bid value corresponding to the received section information corresponding to the subsequent message using the previously accepted bid information records stored in the memory; and for each subsequent message, store the received bid information record if a value represented by the received bid price information exceeds the lowest minimum acceptable bid value; and for each subsequent message, associate one or more particular seats having a predetermined preferential rank with the stored bid information record based on the section identification and bid price information; and determine a ticket price for each of the one or more particular seats associated with a stored received bid information record based on the bid price information in the stored received bid information record associated with the seat; and stop receiving subsequent messages after a predetermined time period.

3. The automated event ticket auctioning system of claim 2 wherein the central controlling computer is further operable to generate and send to each of a plurality of remote terminals through a communication system, a programmed graphical representation of the event venue seating arrangement, designed to convey to auction participants useful standing bid information across the entire event venue, allowing seat bid price locations to be quantified in an effective manner, by the visible location of the seat bid prices within the graphical representation of the event venue seating arrangement.

4. The automated event ticket auctioning system of claim 3 wherein the central controlling computer is further operable to execute a programmed method for ensuring contiguous grouping of seat locations within each multiple-ticket bid.

5. The automated event ticket auctioning system of claim 4 wherein the central controlling computer is further operable to execute a programmed method for ensuring that the standing bid price information is automatically updated on a real-time basis and presented as such to all auction participants; said programmed method employing programming features such as html META refresh (a client pull type browser directive) or multipart/mixed MIME format (a server push type browser directive).

6. The automated event ticket auctioning system of claim 1 wherein the central controlling computer is further operable to display a notice at the one of the plurality of remote terminals that at least one ticket has been awarded for the received bid information record submitted from the one of the plurality of remote terminals.

7. A method of conducting an automated ticket auction by receiving bids from auction participants located at a plurality of remote terminals, the automated ticket auction for a plurality of seats within a venue and corresponding to at least one particular event, the venue having a plurality of sections and each section having a plurality of seats, the method comprising the steps of:

(a) providing a central computer including a seating database having a predetermined preferential rank for each seat in each section;

(b) receiving bid records at the central computer from the plurality of remote terminals through a communication system, the bid records including information concerning bidder identification and bid amount;

(c) determining a lowest acceptable bid amount and determining acceptable bid records based on the lowest acceptable bid amount;

(d) storing acceptable bid records in an auction database of the central computer;

(e) assigning a rank to each acceptable bid record stored in the auction database based on the bid amount;

(f) associating each acceptable bid record stored in the central computer with at least one seat in the venue based on the rank assigned to the bid record and the predetermined preferential rank of the at least one seat; and (g) determining a ticket price for the at least one seat in the venue based on the bid amount in the bid record associated with the at least one seat in the venue.

8. The method of claim 7 further comprising the steps of:

(h) terminating the receipt of bid records at the central computer; and (i) notifying, at the remote terminals, auction participants submitting acceptable bid records that they have been awarded tickets to the event at the determined ticket price.

9. The method of claim 8 further comprising the step, between steps (f) and (g), of determining bumped bid records based on the lowest acceptable bid amount and removing bumped bid records from the auction database of the central computer.

10. The method of claim 8 further comprising, between steps (h) and (i), the step of executing a programmed method for ensuring contiguous grouping of seats associated with any bid record wherein the desired quantity information indicates a desired quantity of more than one seat.

11. The method of claim 7 wherein the bid records of step (b) further include desired quantity information, and wherein the number of seats associated with each acceptable bid record in step (f) is also based upon the desired quantity information.

12. The method of claim 7 wherein the bid records of step (b) further include desired section information, the rank assigned in step (e) is also based upon the desired section information, and the association in step (f) is also based upon the desired section information.

13. The method of claim 7 further comprising the step of identifying key seats throughout the venue and displaying on the remote terminals a graphical representation of the venue wherein the bid amounts for bid records associated with key seats are displayed to convey to auction participants useful bid information across the entire venue for the particular event.

* * * * *